United States Patent [19]
Allen

[11] Patent Number: 4,685,282
[45] Date of Patent: Aug. 11, 1987

[54] HAY RAKE ASSEMBLY

[76] Inventor: David R. Allen, 180 No. Fruit St., Fresno, Calif. 93706

[21] Appl. No.: 760,759

[22] Filed: Jul. 29, 1985

[51] Int. Cl.⁴ .............................................. A01D 7/00
[52] U.S. Cl. ....................................... 56/377; 56/367; 56/14.9; 56/DIG. 11
[58] Field of Search .................................. 56/365-367, 56/377, 376, DIG. 11, DIG. 14, DIG. 21, 14.9, 15.1-15.2, 15.5

[56] References Cited

U.S. PATENT DOCUMENTS

| | | | |
|---|---|---|---|
| 2,413,807 | 1/1947 | Warne | 56/DIG. 11 X |
| 2,469,622 | 5/1949 | Acton | 56/DIG. 11 X |
| 3,645,077 | 2/1972 | Hauser-Lienhard | 56/377 X |
| 4,078,366 | 3/1978 | Carmichael | 56/377 |
| 4,179,872 | 12/1979 | Gerlinger | 56/366 |
| 4,194,348 | 3/1980 | Gerlinger | 56/377 |
| 4,202,160 | 5/1980 | Van der Lely | 56/366 |
| 4,478,032 | 10/1984 | Inskeep | 56/DIG. 21 X |
| 4,566,258 | 1/1986 | Quataert | 56/377 X |

FOREIGN PATENT DOCUMENTS

2052237 1/1981 United Kingdom ......... 56/DIG. 10

Primary Examiner—Henry J. Recla
Assistant Examiner—Angela D. Sykes
Attorney, Agent, or Firm—Ralph S. Branscomb

[57] ABSTRACT

A hay rake assembly is characterized by the use of two, three, or even more individual hay rakes which are towed behind a single towing vehicle. Each of the rakes is on an individual gooseneck which is under hydraulic control from the towing vehicle so that it will swing out to establish its own swath, independently of the other rakes, on command from the operator of the towing vehicle. This yields great flexibility in the raking of hay and combining of windrows, and the apparatus is also characterized in that each rake may be reversed on its gooseneck so that the hay rake is converted into a tedding machine. Several other angular and elevational adjustment of the rake basket, most of which are hydraulic, also represent part of the invention.

14 Claims, 22 Drawing Figures

HAY RAKE ASSEMBLY

FIELD OF INVENTION

The invention is in the field of agricultural and crop treating equipment, and specifically relates to hay rakes (which may also be usable on other crops in addition to hay) and other devices which in their use are drawn over a field or other land surface and must cover a swath of ground.

DESCRIPTION OF THE PRIOR ART AND HAY RAKING TECHNIQUE

Hay raking must be accomplished after the hay has been cut to accumulate the cut hay into windrows, and is also done subsequent to windrow formation to move windrows or combine windrows together, ready for the final bailing operation. A traditional hay rake utilizes several tine bars which maintain the tines in depending orientation at all times, and rotate between a pair of parallel, angled reels. The reels drive the tine bars around an elliptical path, as seen from the side, which in turn rotate the tines in planes striking an angle of about 50 degrees to the right or the left of straight.

Until recently, the great majority of all hay rakes derived the power to rotate the reels directly from the wheels. In other words, there is a mechanical linkage which relied upon the traction of the wheels of the hay rake itself in order to drive the hay rake. The mechanical, wheel-driven hay rakes were disadvantageous in that, first, the raking speed varied with the speed of the moving hay rake and stopped when the rake stopped. Also, in conditions in which the rake wheels would slip, the motion of the rake itself obviously would slow down and falter. With such a device, there is no control over the speed in which the rake reels travel other than by increasing or decreasing the traveling speed of the rake itself.

The instant inventor improved the above-recited situation in the late 1970's by the incorporation of hydraulic drive means into the mechanically driven rake. Retrofitting kits were sold to convert the mechanically driven rakes into hydraulic units, with the hydraulic power being conveniently taken from the tractor which pulled the rakes.

However, even with the addition of the hydraulic power, the traditional hay rake was straight-jacketed in its performance and extremely limited in its flexibility, at least in part because of the limiting design requirements which had their origin in the necessity of taking the power to drive the rake itself from the wheels. The mechanical drive from the wheels to the rake, and the necessary linkage, resulted in an overall rake structure which was not by nature particularly adaptable to varying the orientations of the rake relative to the direction of travel, or the interchanging of left hand with right hand rakes, for example to create a "V" or inverted "V" depending on field and harvest conditions.

Basically, the old unit was rigid and V-shaped, and had to be dismantled before it would be trailable on a roadway. It was difficult to exchange one rake basket or rake for another. It was basically an unmodifiable unit that was towed down the field and combined field hay from either a loose form, or in the form of a pair of windrows, into a central windrow deposited behind the tractor.

For this reason, in addition to the aforementioned provision of the hydraulic drive for the existing hay rakes which the inventor marketed and sold in the late 1970's, he also produced a much improved rake assembly which is the subject of U.S. Pat. No. 4,343,142, issued on Aug. 10, 1982. This assembly basically utilized a pair of lateral extensible beams, extensible respectively to the left and the right of the central rake carriage. Each of these beams carried on it a separate rake. Each of the rakes could be extended out as far as desired, and the orientation of the rake relative to the direction of travel of the rake and towing vehicle was hydraulically alterable by the operator of the tractor.

In this improved rake assembly, the two rakes could be folded into the center of the apparatus, longitudinally extended behind the tractor for very convenient road travel. This rake arrangement utilized two separate rakes which would form what basically amount to modified V-formations to create different windrow patterns and to accommodate different field and baling conditions. Nonetheless, the same basic format of the older rakes, that is, the V-formation, was retained. The "V" could be made narrower or flatter, and the rakes could be separated from one another to define a pair of parallel windrows, or the "V" could be flattened out completely for trailing on the roadway. Nonetheless, despite the fact that this unit provided enormous flexibility and ease of handling compared to the earlier mechanical models and the modified, hydraulically driven versions of the mechanical models, it nonetheless operated under some design constraints inherited from the traditional V-shaped, rigid, mechanically driven hay rake configuration.

In addition, aside from the raking of hay, most hay farmers need to ted hay from time to time, especially in the Midwest, where the drying time of the hay is much longer. The tedding process traditionally has required a completely separate tedding machine.

The tedding machine has tines something like a hay rake, but rather than raking the hay all the way across a swath into a windrow trailing the edge of a rake, the tedding machine merely lifts, fluffs, and loosens the hay so that the moldy slime that would otherwise form beneath the windrow, especially during wet conditions, is prevented from forming. One of the criteria of the tedding machine is that it treat the hay gently. At this stage in its processing, hay that needs tedding cannot withstand the relative beating that it would receive from the hay rake, if a hay rake were used to turn the hay over rather than the tedding machine.

The problem is that the necessity of having a tedding machine adds yet another piece of equipment to the equipment inventory requirements requirements of the farmer. Even though the tedding is done relatively infrequently in many places, nonetheless, when the tedding is required, the machine is required, and thus the tedding machine must be maintained on hand. It would be highly desirable to have a hay rake that would be convertible for use as a tedding machine, as this would eliminate a piece of equipment that is almost as expensive, if not as expensive, as the hay rake itself.

SUMMARY OF THE INVENTION

The instant invention addresses all the above-stated problems with existing hay rakes, and with the requirement for the use and generally the possession of a separate tedding machine. The rake apparatus disclosed in the instant disclosure departs from the additional V-shaped pair of hay rakes, and hay rakes that are rigidly connected to their towing bar and towing apparatus such that they are towable in a single orientation only.

The rakes of the instant invention, on the contrary, each has a gooseneck attached to the individual rake. The gooseneck is towed, and hydraulic means are used which establish an angle between the wheels of the individual hay rake and the individual gooseneck. By making the angle between the wheels and gooseneck more acute, the hay rake, as it is being towed, will swing out and make a wider and wider angle with the line of advancement of the towing vehicle. Thus, one of the essential, core features of the invention lies in the fact that several rakes can individually be hydraulically adjusted to swing into different paths behind the towing vehicle, generally such that each rake cuts a swath immediately adjoining the swath of another rake with the result that a large swath is raked, constituting a combination of the component swaths raked by the individual units.

In keeping with the overall advantage achieveable by the utilization of such hydraulic swath-positioning adjustment means, each individual rake also has means to adjust the angle of the rake basket itself relative to the direction of advancement of the rake. In other words, a rake can advance across the field virtually orthogonally, cutting the widest swath possible, or the rake basket can be adjusted to a greater and greater angle so that only a small portion of the full swath is raked by the individual unit. The basic reason for adjusting the rake to cover a narrower swath would be to accommodate a very heavy cut condition, in which so much hay would be lying on the field that the creation of a single windrow out of an entire, full swath would be too heavy for the drying of the hay, or for the bailing machine.

The angle of attack of each hay rake, which in turn determines the width of swath the individual unit rakes, is manually established before the apparatus begins raking by a simple adjustment of the angle of the rake wheels relative to the rest of the rake. Once this angle has been established, the angle of attack of the rake has been set, and from this point on, the actual positioning laterally outwardly or inwardly of each individual rake relative to the longitudinal center line of advancement of the towing vehicle is controlled on board the towing vehicle by the operator using hydraulic valves. Thus the operator can swing the units closer together if a small angle of attack has been set for the rake baskets so that there are no gaps between the swaths cut by the individual units. Conversely, a simple operation of the hydraulic control from the tractor can cause the individual units to swing outwardly, for example when a full swath adjustment has been established for each of the individual units.

Although it is certainly desirable to be able to adjust the lateral positioning of the swaths relative to one another, the main advantage of the hydraulically controlled swath positioning lies in the ese in which the unit can be set in its road transport mode. By a simple operation of the hydraulic valve controls on the tractor, the rakes, which are three in number in the accompanying description, can be swung into longitudinal alignment for road travel. The individual rake baskets can be angled relative to the direction of travel to make the effective width of the assembly even narrower as it travels down the highway.

Another major advantage of the configuration of the individual rake assemblies of the instant invention lies in the fact that by reversing the rake, it is effectively converted into a tedding machine. Each rake proper is mounted to its respective gooseneck on a substantially vertical axis, about which the rake can be rotated to put the wheels, which otherwise would trail the rake basket, in front of the rake basket. With the basket orthogonally extended relative to the gooseneck, and the rake operating in the reverse direction (effectively), a very gentle action is achieved which will move a windrow over slightly, which not only fluffs and loosens the hay, but also exposes the wet, mold-producing strip of ground beneath the previous windrow location for drying.

Other features of the invention, including a number of hydraulically and otherwise adjustable elements, will become apparent from the below description and drawings.

DETAILED DESCRIPTION OF THE PREFERRED EMBODIMENT

For simplicity of discussion in this description, the invention will be described as a "hay rake," and the individual working units may be individually described as hay rakes. It is understood, however, that many of the features of the invention pertain to any land working apparatus, such as fertilizer spreaders, sprayers, etc., in which the unit or units pass over the field or ground to process a crop or the land underneath. Also, the hay rake as described herein may be used without modification in bean farming and perhaps in flax hay farming and other applications. Beyond the utilization of the mechanism as a hay rake, as indicated, other agricultural processes which require that a field be covered in swaths could make us of many of the features of the invention which are independent of the actual structure of the rake units themselves.

Figure 1:
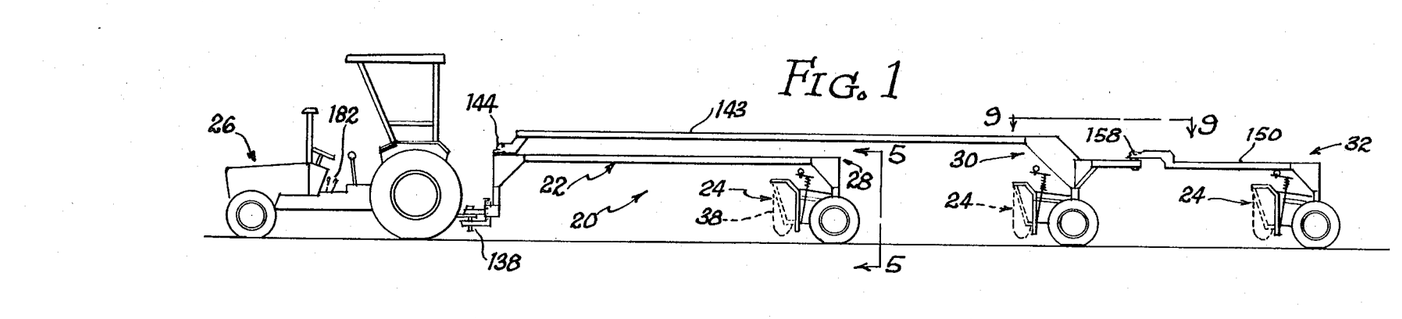
FIG. 1 is a diagrammatic side elevation view of the hay rake apparatus.
Figure 15:
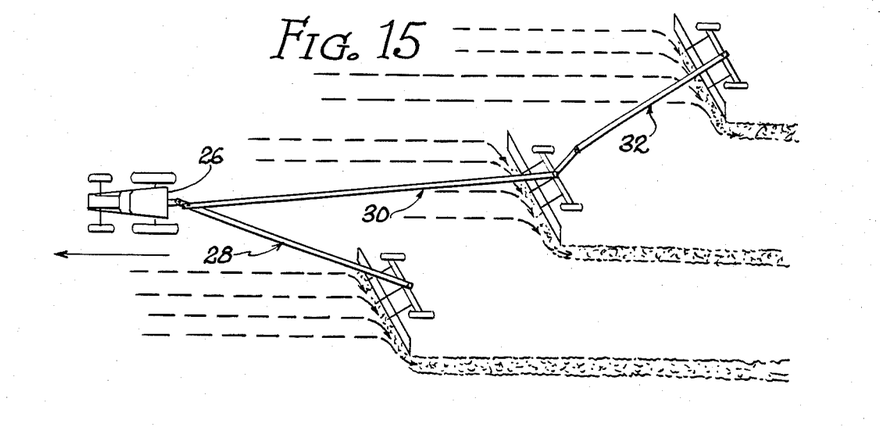
FIG. 15 illustrates a typical series of three left-handed rakes in use to form three separate windrows.
Figure 16:
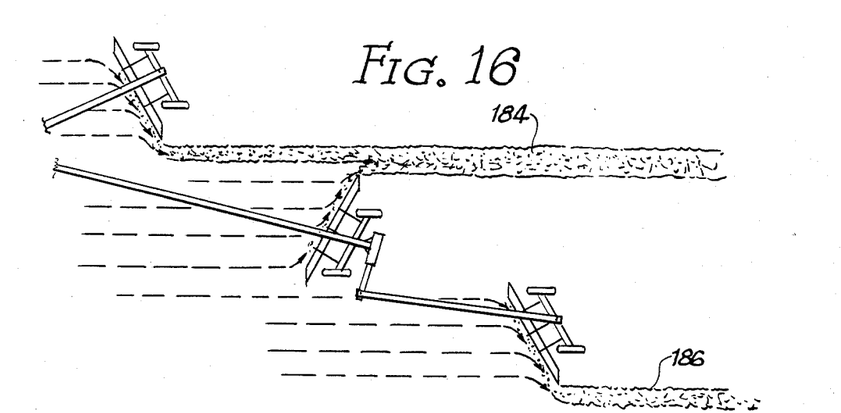
FIG. 16 illustrates the use of two left-hand, and a central right hand, rake to create one large windrow and one partial windrow.

With that in mind, the basic unit is referred to in the claims as a "working unit" and is indicated at 20 in FIG. 1. The working unit is comprised of a gooseneck 22 and a work implement 24, which as indicated could be a fertilizer spreader, a soil treatment apparatus, or other assembly, but in the instant invention, is illustrated and described as a hay rake. FIGS. 15 and 16 provide an overview showing how the working units are towed behind a tractor 26 in a typical array. These figures will be discussed in more detail after the detailed description as presented pertaining to the exact physical nature of the hay rakes and their goosenecks.

Figures 2, 3:
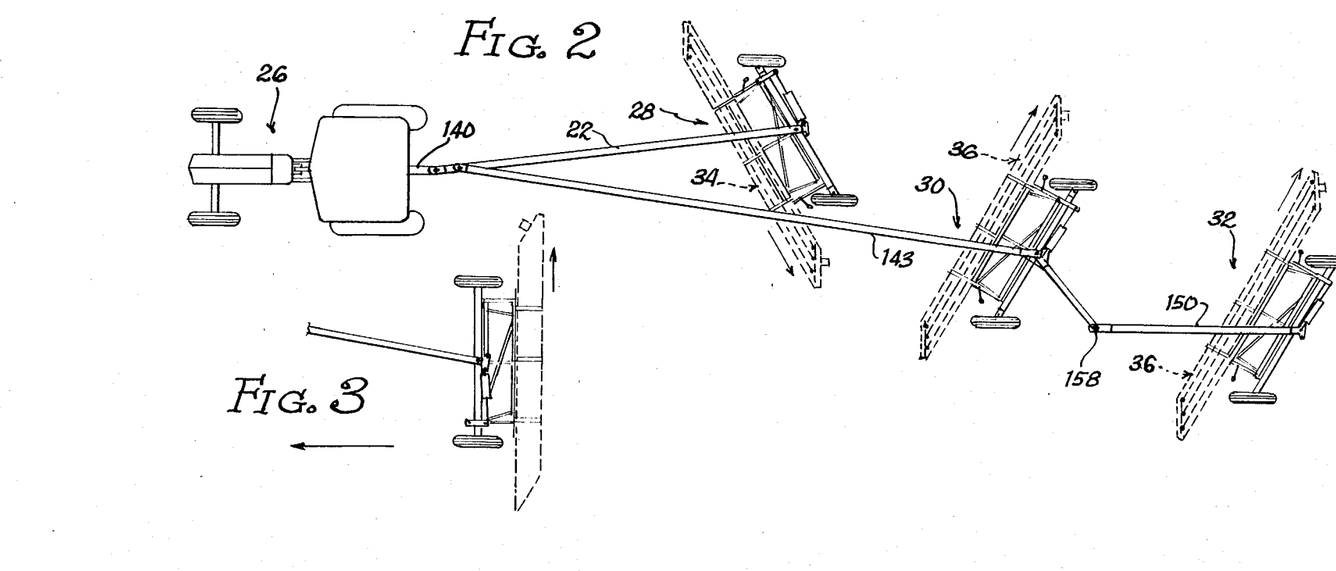
FIG. 2 is a top plan form view of the hay rake apparatus of FIG. 1 with the rake baskets shown in phantom.
FIG. 3 illustrates a rake unit and its tedding mode.
Figure 19:
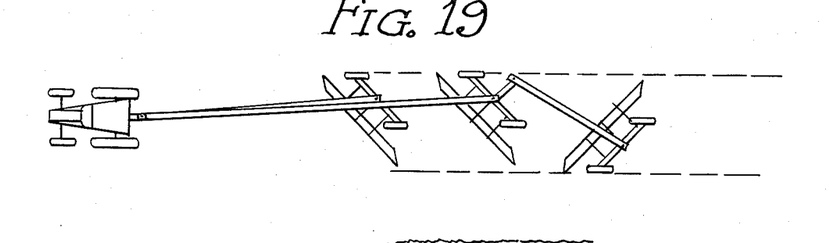
FIG. 19 illustrates the configuration of three hay rakes in road transport mode.

The hay rakes themselves are identical from one working unit to the next. In the disclosed embodiment, there are three working units. Referring to FIGS. 2 and 15, the lead working unit 28 is the first unit in the series, followed by the second unit 30 and a subsequent 32. The third unit is referred to as the "subsequent unit" because its same configuration could basically be duplicated with a fourth, fifth, or even sixth unit. The problem in adding the additional units lies not in their field functionality so much as the difficulty in collapsing the array for road transport, and the difficulty of transporting an array which is very long. One of the big advantages of the invention lies in the fact that it is roadway-transportable without any modification whatsoever. All the operator need do is move in the various working units into a file, as illustrated in FIG. 19, by the manipulation of hydraulic valves mounted in the tractor. This advantage would be largely lost if the array were so long that some of the trailing units would have to be disconnected from the overall system before it could be driven on a roadway. However, with a large enough field, the utilization of more than three rakes might be practical, at least from the agricultural, non-transporting viewpoint.

The hay rakes themselves, as indicated above, are basically identical except that any of the units 28, 30, or 32 could come with a right hand or a left hand rake. Other than coming in slightly different widths, the only variation in the rakes is in their handedness. Their operation is identical. A rake which rakes to the left, as indicated at 34 in FIG. 2 is a left-handed rake, and the other rakes 36 in FIG. 2 are right-handed rakes. Whether a left-handed or a right-handed rake is used in any particular working unit of the array is completely up to the operator. The selection of the left-handed or right-handed rake, however, is one of the few options that is not operator alterable, either hydraulically or manually/mechanically, other than by replacing the rake unit. A left-handed rake cannot be converted to a right-handed rake, but must be exchanged.

RAKE CONSTRUCTION

Figures 4, 5:
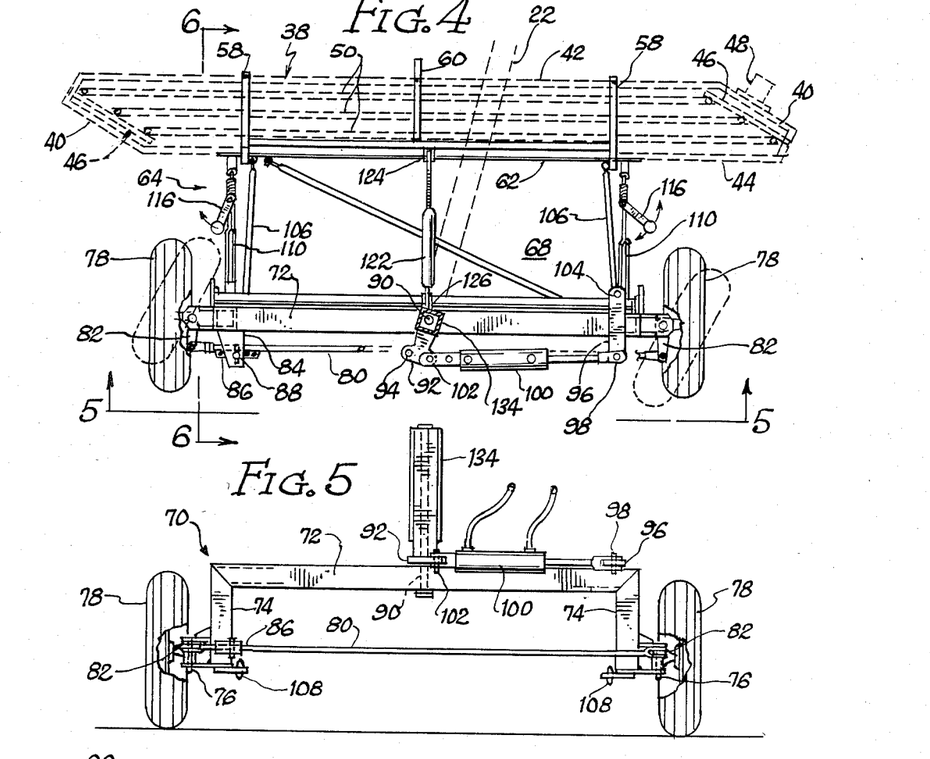
FIG. 4 is a top plan view of a rake unit illustrating the wheel re-configuration assembly.
FIG. 5 is a rear elevation view of the wheel assemblies as seen along line 5—5 of FIG. 4.
Figure 6:
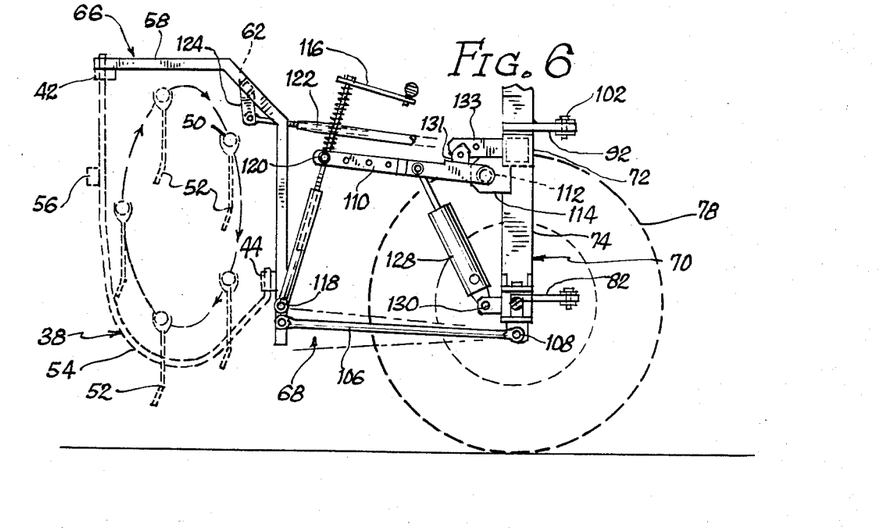
FIG. 6 is a sectional view taken along line 6—6 of FIG. 4 with portions shown in phantom.

Construction of the rake itself is best understood by reference to FIGS. 4, 5 and 6. Turning to FIG. 4, the assembly utilizes a rake basket 38 that is identical in construction to that used on the above-referenced U.S. Pat. No. 4,343,142. It comprises a pair of end plates 40 which are rigid and supported by two sturdy crossbars 42 and 44. The end plates journal reels 46 just inside, and one reel is driven by the hydraulic motor 48 indicated in FIG. 4. The reels are star-shaped and at each point of the star pivotally mounts one end of a tine bar 50. Each of the tine bars mounts a series of rigid, depending tines 52 which travel in an elliptical path as seen from the edge as shown in FIG. 6. These tines pass through tine guards 54, which are spaced and positioned between groups of two or three of the tines. The tine guards pass in an arched path between the crossbars 42 and 44, and are reinforced by a support bar 56, shown in FIG. 6.

The structure as thus far described comprises the basic rake basket. It is essentially a self-contained unit which, when driven, and properly moved over a field, will properly rake hay into windrows. The basket itself is mounted on a basket frame comprising three braces, two outer braces 58 and a central brace 60. The two outer braces 58 are strictly for support purposes, and the central brace 60 has an additional function which will be described when the tedding operation of the apparatus is reviewed. All three of the braces are reinforced by welded reinforcing member 62, and bolted to the top crossbar 42. The outer two braces 58 continue down to bolt to the lower crossbar 44.

These braces are part of the overall frame 64, and constitute the rake basket frame, generally indicated at 66 in FIG. 6. This frame is supported on another subframe, the parallelogram frame 68, which interfaces between the rake basket frame 66 and the wheel-mounting subframe 70.

The wheel subframe 70 is very basic and constitutes a cross member 72, best seen in FIGS. 5 & 6, with depending legs 74, which mount the wheel swivels 76. The wheels 78 freely rotate about a vertical axis on the wheel swivels 76, and are connected behind their pivotal axes by a steering rod 80 which pivotally attaches to steering arms 82.

It is not the purpose of the steering rod 80 to steer the wheels in the conventional sense, but rather to fix them in a set relation to the remainder of the hay rake. As seen in FIG. 4, this is accomplished by virtue of an apertured flange 84 which extends rearwardly from the cross member 72 and indexes with the apertures of a second flange 86 welded to the steering rod. A pin 88 passes through the respective indexed apertures to effectively fix the angle of the wheels relative to the wheel frame, and thus establish the orientation of the hay rake relative to the travel direction. Naturally, at whatever angle the wheels are established, they will swing into parallel tracking relation to the direction of travel when the unit is towed. The utilization of this angle-fixing structure will be described under the operational portions of this description, below.

In addition to the ability to fix the angle of the wheels relative to the wheel frame, the hay rake is pivotally mounted to its gooseneck 22, and has means to rotate the entire hay rake into a selected orientation relative to the direction of extension of the gooseneck. This feature, in connection with the ability to select the angle of the wheels relative to the wheel frame, determines how far out the rake will swing from the longitudinal center line of the tractor when the unit is being towed.

Although this is at the very heart of the invention, the implementation is very simple. Omitting the details of the pivotal connection which will be described in the discussion of the gooseneck, at this point it is enough to say that the gooseneck pivots at 90 degrees about a substantial vertical axis to the cross member 72 of the wheel frame. At the rear of the gooseneck, behind the pivot, is a double-earred orientation plate 92 which has a pair of selectable pinholes 94. The cross member 72 of the wheel frame has corresponding, double-ended plate 96, again with holes 98 and 104 in the respective ends. Connecting the two plates 92 and 96 is a hydraulic cylinder 100, which is removable by virtue of its connection to the plates with removable pins 102. The cylinder is controlled from the cab of the tractor, and as can be easily visualized from FIG. 4, is capable of altering the orientation of the gooseneck 22 relative to the wheel frame 70 about 45 degrees in either direction. It must be borne in mind that this angular variability works in conjunction with, but is totally separate from, the variability of the angle of the wheels 78 to the wheel frame, which is accomplished manually by selectably adjusting the steering rod 80.

For reasons discussed below, one of the advantages of the invention is the ability of the hay rake to pivot and lock at 180 degrees of rotation about the gooseneck axis 90. This is accomplished by removing the hydraulic cylinder 100, rotating the hay rake, and re-fastening the hydraulic cylinder between the left pin hole 94 as shown in FIG. 4, and the pin hole 104 in the plate 96. The cylinder would then extend out to the left as seen in FIG. 4, rather than to the right.

Turning now to the suspension of the rake basket from the wheels, an intermediate parallelogram frame 68 carries the rake basket on the wheel frame. The parallelogram frame includes a pair of lower arms 106 which are pivoted beneath the wheel frame arms at 108, and upper arms 110. The upper arms are mounted on a transverse bar 112 which is rotatably mounted between the pair of plates 114 shown in FIGS. 8 and 12. At the ends of each pair of arms (that is, an upper arm and a lower arm), there is a crank height adjustment 116 that pivots to the bottom portion of the rake frame at 118 and passes through the threaded rotatable nut 120 in the upper arm. Thus, the crank, the upper and lower arms, and the depending leg 74 constitute a parallelogram frame for each side of the hay rake. The top of the rake frame is actually supported by an adjustable spring link 122, which is pivotally connected between a depending flange 124 mounted on the center brace 60, and a clevis 126 mounted to the front portion of the cross member 72 of the wheel frame.

One of the parallelogram frames has a hydraulic cylinder 128, best seen in FIG. 6, mounted between a pivotal clevis point 130 and the upper arm 110, where the cylinder rod is also pivotally connected. Thus, as can be visualized by reference to FIG. 6, as the cylinder expands, as shown in the dotted line at the bottom of that Figure, the parallelogram frame is raised. The spring link 122, together with the lower arms 106, tend to maintain the rake basket in its original orientation as it is lifted and moved backwards slightly. The lift cylinder 128 is used to elevate the rake basket for transport, and once the elevation has been achieved, a pair of mating apertured flanges 131 and 133, best seen in FIG. 6, can be pinned together to maintain the basket in its raised position for transport without ongoing assistance from the hydraulic cylinder.

At this point, the distinction should be made between the elevational action of the height-adjustable cranks 116 and the action of the cylinder 128. The cylinder 128 is strictly for the purpose of elevating the rake basket for transport. The crank adjustment, on the other hand, is strictly for making minor adjustments of the basket height when the cylinder 128 has lowered the basket into its operative position. Field conditions may require fine manual tuning of the height of the basket, which is accomplished by rotation of the two cranks, disposed on opposite sides of the rake.

GOOSENECK CONSTRUCTION

Figures 7, 8, 9:
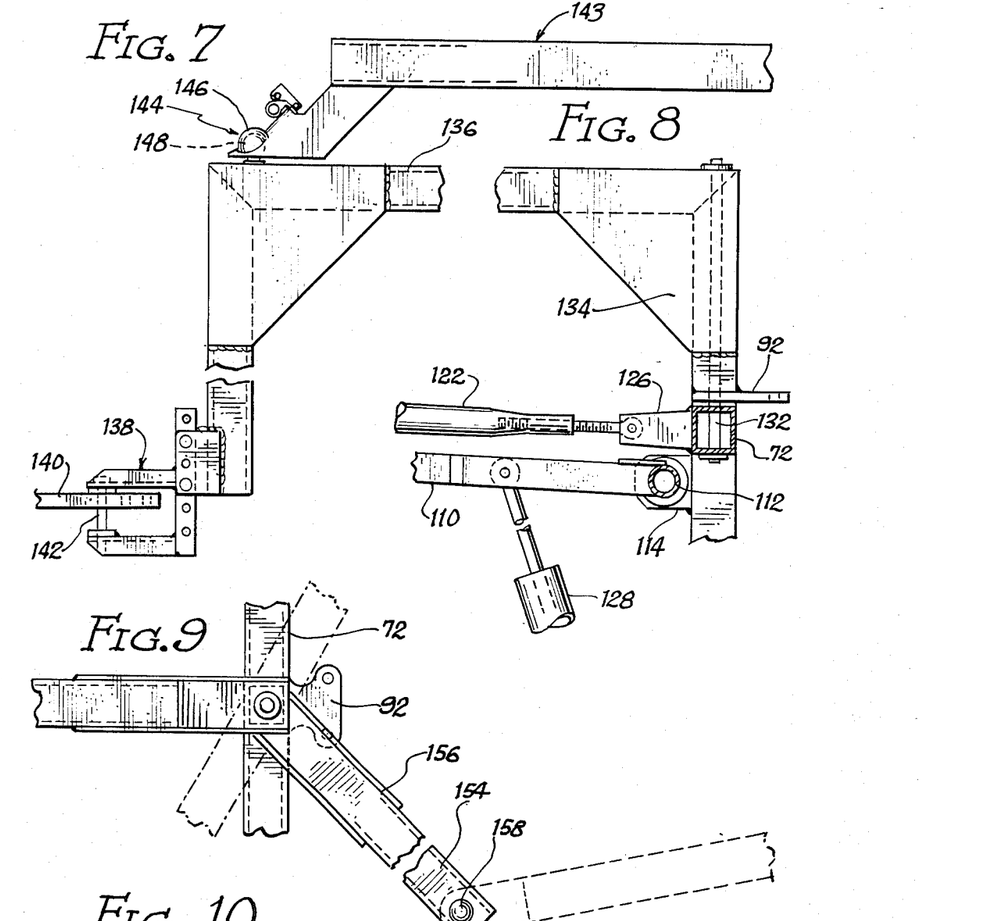
FIG. 7 is an elevational detail illustrating the front of the gooseneck of the lead hay rake.
FIG. 8 is a side elevation illustrating a portion of the wheel frame and the vertical adjustment structure for the rake basket.
FIG. 9 is a top elevation view, shown partially in phantom, of one means of towing a third rake assembly.
Figure 10:
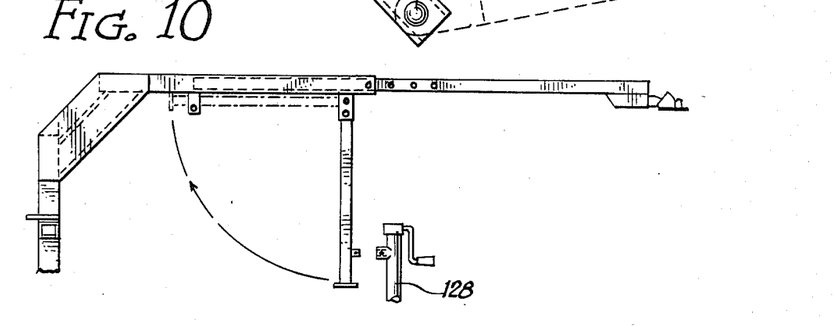
FIG. 10 is a diagrammatic side elevation view illustrating the use of a removable gooseneck support and jack.

As best illustrated in FIG. 8, the gooseneck pivotally attaches to the cross member 72 of the wheel frame by virtue of coaxial pin 132 which passes from the top of the rear gooseneck down through the cross member. The goosenecks shown are really three types, not counting one modification in the description of the second type. The first gooseneck, which is on the leading working unit, is best shown in overall view in FIG. 1. In addition to the rear portion 34 which defines the vertical axially pivotal attachment to the rake, there is an extended horizontal boom portion 136 which terminates forwardly in the gooseneck shape itself, which drops down to define the pivotal link 138. This link is detailed in FIG. 7, and as shown, cooperates with the towbar 149 of the tractor 26, having a pin 142 passing through the towbar so that the boom in the first working unit is towed behind the tractor in conventional fashion. The gooseneck rises up from the rear of the tractor, passes rearwardly, and then comes down on top of the hay rake unit as shown in FIG. 1.

The second gooseneck is longer than the first, and as shown in FIGS. 1 and 7, utilizes a pivotal attachment means 144 consisting largely of a socket 146, which rides on the ball 148 mounted on the forward portion of the first gooseneck. The ball is positioned so that it is almost vertically coaxial with the pin 142, which defines the pivot point of the first gooseneck. However, it is not critical that the first and second gooseneck be coaxially pivoted.

Figure 14:
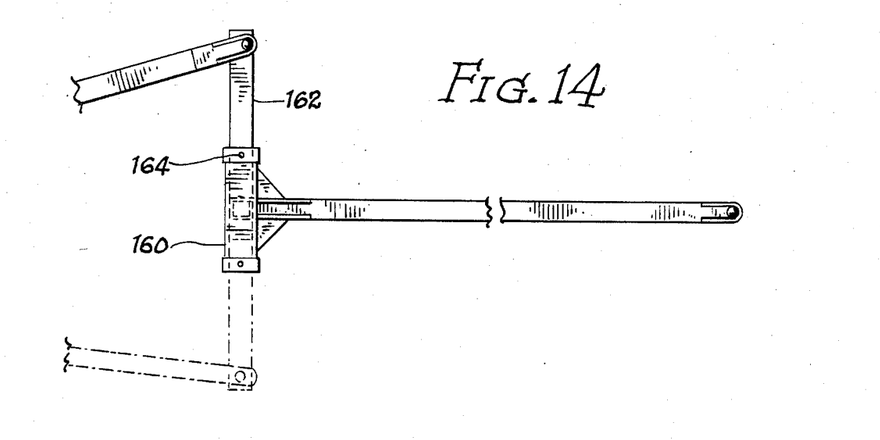
FIG. 14 is a top plan view illustrating the use of the laterally extended, reversible towbar on the second hay rake to tow a third rake.

The second gooseneck also differs from the first in that it is also adapted to tow additional working units. Two basic manners in which the subsequent goosenecks 156 are pivotal to the second gooseneck 143 are shown in FIGS. 9 and 14, respectively. The model currently being produced conforms more to the illustration in FIG. 14. In any event, in FIG. 9, an extended towbar 154 is pinned in socket 156 and mounts a ball 158 on the end. A socket identical to socket 156 could project from the right side of the gooseneck as shown in phantom in FIG. 9, for towing subsequent units on the right side rather than the left. As shown in FIG. 2, the subsequent gooseneck 150 of the subsequent unit 32 pivotally mounts on ball 158 and permits the subsequent unit to be pulled by the secondary gooseneck 143.

In the alternative embodiment shown in FIG. 14, a sleeve 160 is laterally mounted across the top of the rear end of the gooseneck, and a towbar 162 extends to the left as shown in FIG. 14 and is pinned at 164 into the socket. The towbar can be removed and inserted into the right side of the socket and pinned equally easily, as shown in phantom in FIG. 14. The secondary gooseneck in the secondary unit 30 can thus be used for a left hand extended array, or a right hand extended array, as will be described in more detail below.

Figures 11, 11A, 12, 13:
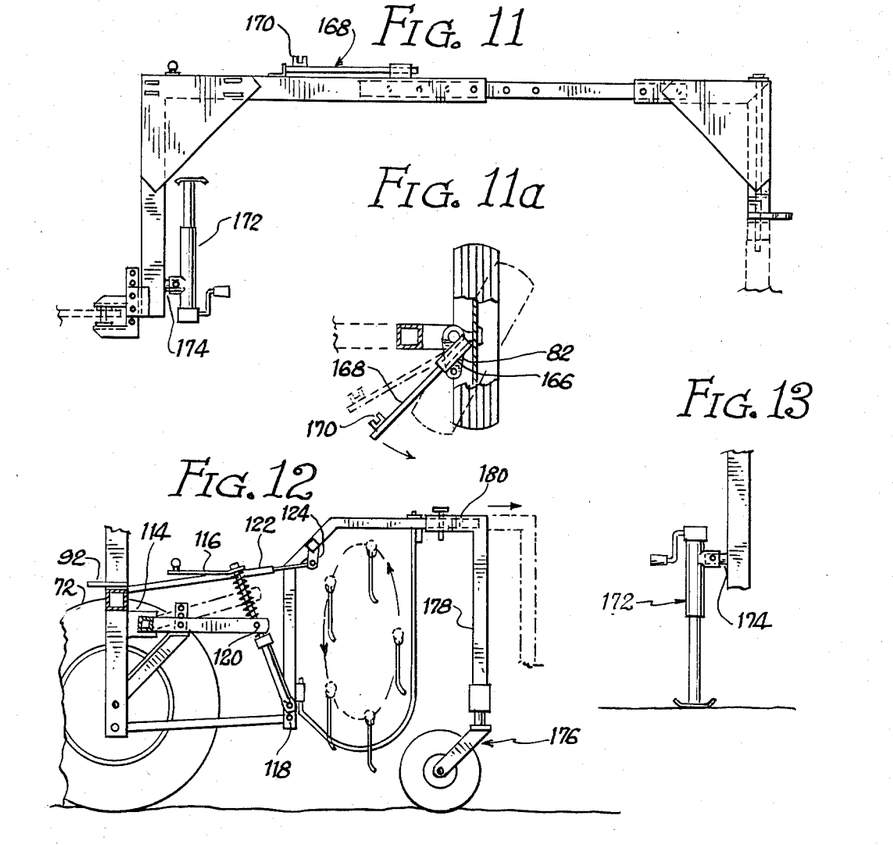
FIG. 11 is a side elevation view of the gooseneck of the lead hay rake illustrating a telescoping modification thereof.
FIG. 11a is a top plan view illustrating the use of the key shown in FIG. 11 to rotate the hay rake relative to its gooseneck.
FIG. 12 is a diagrammatic side elevation view of the hay rake suspension system shown its auxiliary wheel in position.
FIG. 13 illustrates a jack utilized to elevate a gooseneck.

Some of the other details of construction include a socket 166 mounted to the steering arm 82 of the wheel 72 in FIG. 11(a). This socket engages the end of the key 168. The key is shown in operation in FIG. 11(a), and shown in a stowed position on top of the first gooseneck in FIG. 11. The other end of the key has a spanner 170 which is used as a tine guard straightener. Additionally, any or all of the goosenecks could be made telescopically extensible as shown in FIG. 11.

Also in FIG. 11, there is jack 172, mounted in the inverted position on a stud 174 on the forward end of the first or leading gooseneck. This jack may be righted as shown in FIG. 13 and utilized to raise the first gooseneck, or any subsequent goosenecks suitably provided with a stud 174, so that it may be free-standing in the field and permit the tractor, and the tractor with one or more of the other working units, to move on.

Another feature of the invention is the swivel, or "crazy" wheel 176. This wheel is mounted into a frame comprising an upright post 178 and a horizontal sleeve 180 which slips over the end of the center brace 60 as shown in FIG. 12. This easily installable and removable wheel is essential to the rotation of the hay rake into its reversed position shown in FIG. 3. Because the rake must make a 180 degree turn, as can be easily visualized by reference to FIG. 3, when it reaches the position in which the wheel frame is essentially parallel with the gooseneck, there is no support other than the torsion on the gooseneck itself to prevent the hay rake, which is overbalanced in the forward direction, from falling forward on its face. The crazy wheel provides this support as the wheel is rotated into the position shown in FIG. 3, and is subsequently removed and stored in a handy clip some place on one of the working units.

As shown in FIG. 1, the cab of the tractor is provided with hydraulic controls 182. These controls operate both cylinders 100 and 128 for each of the working units. Hydraulic lines feed around the rotary connections at the front ends of the respective goosenecks, and have quick-disconnect joints to permit separation of the unit. The hydraulic system has not been shown, inasmuch as it is the product of routine hydraulic engineering and does not in itself embody any inventive elements.

OPERATION

Operation of the set of working units, or hay rakes, is best understood by reference to FIGS. 2–3 and 15–21. FIG. 1 illustrates the rakes in an orthogonal orientation relative to their respective goosenecks. This could be one mode of towing the rakes, but ordinarily the rakes would not be in this position in use on the field. FIG. 2 also illustrates the configuration that the rakes might strike as they are moved in behind the tractor for transport. The third rake 32 would not in ordinary field usage be oriented as shown, but would be a left-handed rake canted in the opposite direction as shown in FIG. 16.

Actual hay raking can be done with a number of different configurations of rakes. As shown in FIG. 15, three left-handed hay rakes are utilized in the first, second, and third positions, such that each rake creates its own separate windrow. This is a fairly common configuration. If each of the rakes in FIG. 15 were right-handed and canted to the right rather than to the left, all three rakes would combine the hay into a single windrow.

It should be noted with reference to FIG. 15 that in the event that the hay is very thick on the field, and smaller windrows are desirable, the orientation of the hay rake baskets to the direction of travel can be changed by adjusting the steering rods 80 while the apparatus is stationary. This will cause the rake to cut a swath at a more acute angle, reducing the effective width of the swath, and causing the operator to move the outer rakes in somewhat closer, so that 100 percent coverage of the field is achieved. The net result would be that a smaller overall swath would be covered by the apparatus. For an effect opposite that achieved in FIG. 15, reference is made to FIG. 16. In this instance, it is desirable to rake a double amount of hay into a single windrow. This would be done either because the hay cut is light, and/or the baler that will be used to bale the hay from the windrow is of the type that creates large bales and works best with a thick windrow. In this configuration, the first and second rakes, being respectively left and right handed rakes, create a thick windrow 184. Meanwhile, the outboard rake shown at the lower right, which is a left hand rake, creates a half-thickness windrow 186. When the apparatus arrives at the end of the field, it will turn around and circle back, under the swath it cut in FIG. 16 of the drawings, with the outboard rake adding one more half-thickness windrow to the windrow 186 to make a full thickness windrow, while the other two rakes create another thick windrow beneath it. Thus, in two sweeps, three uniformly thick, dense windrows have been created.

Figures 17, 18:
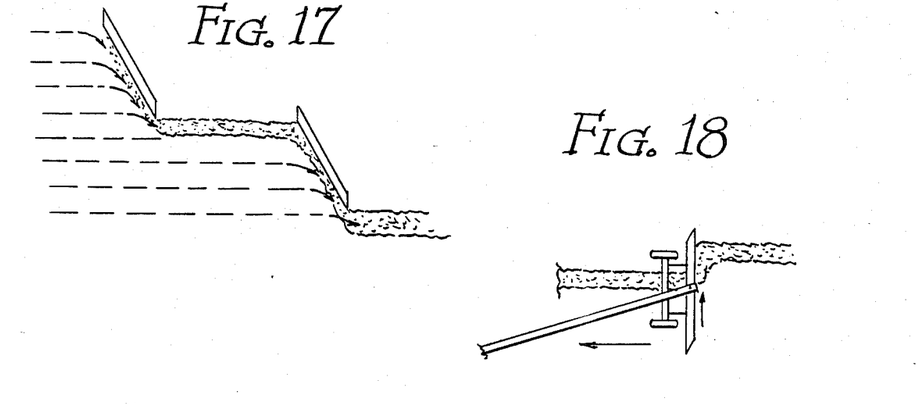
FIG. 17 illustrates the utilization of two left-handed rakes to create a single dense windrow.
FIG. 18 illustrates the use of a rake in a tedding configuration.

In FIG. 17, two of the rakes are diagrammatically illustrated in a configuration in which the front rake feeds the rear rake to create a single windrow coming off the rear rake. All three rakes could be used in the same fashion to create a single windrow as mentioned above. When the hay cut is light, creating a single windrow from three rakes, increases the efficiency of the baling machine as it reduces the number of passes required.

Any combination of rakes imaginable can be used. Two rakes can be used in a "V" combination as shown in FIG. 16, or in an inverse "V" configuration, shown at the bottom of FIG. 16. Any of the rakes can be replaced with a left or a right rake at any of the positions. Each of the units can be swung the proper distance outside of the line of travel of the tractor by the simple operation of the controls 182 in the tractor, to operate the orientation cylinders 100 of the appropriate rake or rakes. Response of the unit is virtually immediate. As soon as the orientation of the wheels and the gooseneck is changed, the unit will swing until the wheels are tracking parallel to the direction of motion.

The configuration shown in FIG. 15, and in the other drawings, is the preferred embodiment wherein the first unit pivots from the tractor, the second unit pivots from the forward portion of the first gooseneck, and the "subsequent" unit, which would be the third unit in this diagram, pivots from and is towed by the rear portion of the second gooseneck.

Figure 20:
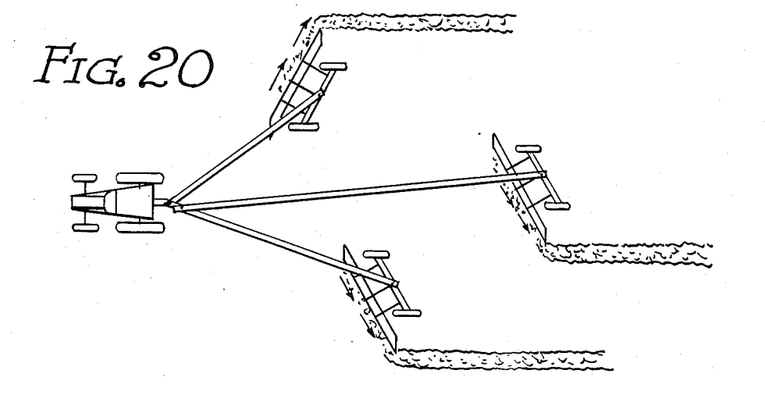
FIG. 20 illustrates an alternative embodiment wherein three rakes are towed directly from the tractor; and, FIG. 21 illustrates a hay rake chain configuration.

However, other configurations are conceivable. As shown in FIG. 20, all three units could be pivoted from the tractor directly. Either the front two could be brought parallel to one another and closed in close for towing, or the units could have goosenecks of staggered length so that an orientation of FIG. 15 could be achieved, but with direct linkage of all hay rakes to the tractor, so that no chain effect would be achieved at all.

Figure 21:
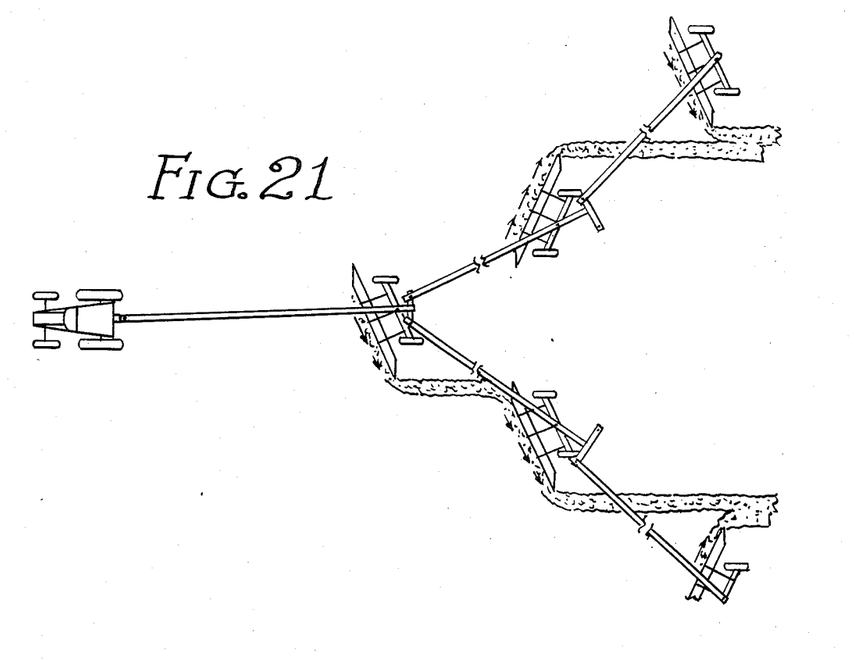

FIG. 21 illustrates another alternative in which a true chain is created. In this embodiment, the first unit pivots from the tractor, with a chain of units stringing back from both the left and right side of the first unit. Obviously, only one side of the chain could be used, or two units on the left could be used in conjunction with one on the right, etc.

One of the most important features of the invention lies in its ability to convert the hay rake to a tedding machine. The configuration of the rake when used for tedding is illustrated in FIGS. 3 and 18. Note that the wheels, which ordinarily are at the rear of the hay rake, are now in front. As described above, this configuration is achieved by removing the cylinder 100, as shown in FIG. 4, swinging the rake around by use of the crazy wheel 176 and the keyway 166, and re-attaching the cylinder 100 so that it connects from the rear of the gooseneck to the opposite side of the wheel frame. Of course the wheel 176 is removed after the rotation has been completed, and then the rakes are drawn across a windrow as shown in the above-referenced FIGS. 3 and 18.

When tedding, the wheels straddle the windrow, and the action of the rake tines is directed rearwardly and at an angle. Because the direction of tine motion is in part cancelled by the motion of the rake, the action is very gentle, and the tedding is effected without damaging the hay.

When tedding, the orientation of the rake basket to the direction of travel is essentially orthogonal, as is shown in both of the above-referenced Figures. Nonetheless, the gooseneck can be swung out to achieve a substantial angle so that three windrows can be tedded at the same time. The angle of attack of the rake basket is independent of the angle of extension of the gooseneck because of the dual adjustability achieved by the cylinder 100 and the manually adjustable steering rod 80.

Because of the ability of the hay rake to be used in tedding, a fairly expensive but relatively infrequently used piece of equipment, that is, a tedding machine, need not be purchased. This feature makes the economic feasibility and practicality of the machine even greater. Even without the tedding capability, the hydraulically operated, extremely versatile apparatus set forth herein can be sold at a price no greater than that of a conventional hay rake, and yet enables a single operator to cover at least 50 percent more of the field in a single sweep.

As has been mentioned, more than three units could be used, provided the trailability on the roadway is not a problem. Conversely, fewer than three could be used. Although a substantial advantage of the use of the apparatus lies in the fact that three or more swaths can be raked or tedded simultaneously, nonetheless a farmer wishing to use one or two of the rakes could certainly do so and suffer no adverse consequences from the omission of the third and subsequent rakes from the array.

All in all, the rake apparatus represents the absolute state of the art in hay raking, and represents another substantial step forward in the improvement of agricultural machinery and the conversion of an agrarian, manual labor industry to a high technology, highly efficient industry in keeping in sophistication with the computer and information age.

I claim:
1. A ground-traversing, land working apparatus comprising:
   (a) a set of working units;
   (b) each of said working units comprising:
      (i) a work implement having wheels for traversing the ground and defining a work implement travel direction;
      (ii) a gooseneck connected to and extending from said work implement;
      (iii) orienting means for substantially independently selectably establishing the angle of extension of said gooseneck relative to said work implement travel direction;
   (c) said working units each having pivotal attachment means to permit the towing of same, whereby said orienting means can establish the angle of extension of each of said goosenecks relative to the respective work implement such that independent selective paths across the ground are traversable by the work implements of said set;
   (d) a towing vehicle for said working units and a control means mounted on said towing vehicle and accessible to an operator thereon, said control means being operable to operate the orienting means of the responsive working units; and,
   (e) said goosenecks and respective work implements being mutually rotatable about a vertical axis, and said orienting means each comprising a hydraulic cylinder operative between the respective gooseneck and work implement, and said control means comprises manually operable hydraulic valves.

2. Structure according to claim 1 wherein said set includes a lead working unit, the gooseneck of said lead working unit extends forwardly from the work implement thereof to define a forward end defining the respective pivotal attachment means therefor for attachment to a towing vehicle, and said set includes a second working unit having pivotal attachment means making same pivotally attachable to a forward portion of the gooseneck of said lead working unit.

3. Structure according to claim 2 wherein, in addition to said lead and second working units, said set includes at least one subsequent working unit, each of said at least one subsequent working units being pivotally attachable to a working unit in front of it.

4. Structure according to claim 3 wherein each of said working units has a rear portion and and each of said at least subsequent working units is pivotally attachable to the rear portion of a working unit in front of it.

5. Structure according to claim 4 wherein at least one of said working units includes a laterally extended towbar having mounting means on the end thereof to engage the pivotal attachment means of a subsequent working unit to offset same laterally from said at least one of said working units.

6. Structure according to claim 5 wherein said laterally extended towbar has a plurality of selectably laterally extended positions to variably laterally offset the subsequent working unit from the more forward unit.

7. Structure to claim 6 whrein said towbar is reversibly extendable in the opposite lateral direction to selectably offset a subsequent working unit in the opposite direction.

8. Structure according to claim 3 wherein each of said working units except said lead working unit is a trailing unit and pivotally attaches to and is towed by a working unit forward thereof, and each of said trailing units has a gooseneck configured to attach to the forward working unit and physically clears same when said working implements are swung into substantial longitudinal alignment with one another for highway travel and transport.

9. A ground-traversing, land working unit comprising:
   (a) a hay rake having a rake basket and wheels offset from said basket for traversing the ground and establishing a travel direction;
   (b) means for towing said hay rake in a forward direction, said means being rotatably attached to said hay rake about a substantially vertical axis;
   (c) fixing means for selectably fixing said hay rake in an orientation about said vertical axis with either the wheels in front of the basket, or alternatively, in a second mode with the wheels behind the basket.

10. Structure according to claim 9 wherein said means for towing comprises a gooseneck extending from said hay rake and said fixing means comprises a hydraulic cylinder connected between said gooseneck and said hay rake, said hydraulic cylinder being releasable to free said hay rake to rotate 180 degrees about its vertical axis relative to said gooseneck and being refastenable to fix said hay rake in the second mode.

11. Structure according to claim 9 wherein said hay rake has two wheels and including a third removable wheel and means to removably mount said third removable wheel on the side of the rest of said hay rake remote from said two wheels to permit rotation of said hay rake into its second mode without falling forward.

12. Structure according to claim 11 wherein said hay rake has a rake basket with a central brace having a forwardly extended end, and said third removable wheel is mounted on a channel which inserts over said extended end.

13. A hay rake comprising:
   (a) a rake basket;
   (b) wheels;
   (c) a frame supporting said rake basket on said wheels;
   (d) selective elevation means powered by a hydraulic cylinder for operating said basket between a lower raking mode and an upper transport mode;
   (e) mechanical means for releasibly locking said basket in said transport mode;
   (f) said frame including a basket frame, a wheel frame, and an adjustable parallelogram frame mounting said basket frame to said wheel frame, and said hydraulic cylinder operating between said wheel frame and said parallelogram frame; and,
   (g) said parallelogram frame including at least one mechanically vertically adjustable crank means to adjust the height of said basket frame above the ground to accomodate differing field conditions.

14. Structure according to claim 13 wherein said parallelogram frame includes two upper and lower arm pairs, and said crank means is duplicated and connected respectively between the upper and lower arm of each pair to selectably contract and separate said arms.

* * * * *